United States Patent [19]

Hergenrother et al.

[11] Patent Number: 5,145,942
[45] Date of Patent: Sep. 8, 1992

[54] METHYL SUBSTITUTED POLYIMIDES CONTAINING CARBONYL AND ETHER CONNECTING GROUPS

[75] Inventors: Paul M. Hergenrother, Yorktown; Stephen J. Havens, Newport News, both of Va.

[73] Assignee: The United States of America as represented by the Administrator of the National Aeronautics and Space Administration, Washington, D.C.

[21] Appl. No.: 589,571

[22] Filed: Sep. 28, 1990

[51] Int. Cl.$^5$ .................. C08G 69/26; C08G 8/02; C08G 79/02
[52] U.S. Cl. .................... 528/353; 528/125; 528/128; 528/172; 528/185; 528/352; 564/315; 564/328; 564/422; 564/440; 564/442; 564/443; 564/502; 56/418

[58] Field of Search ............... 528/125, 128, 172, 185, 528/353, 352, 229; 564/315, 328, 428, 440, 442, 443, 502; 556/418

[56] References Cited

U.S. PATENT DOCUMENTS 4,820,791  4/1989  Hergenrother et al. ............ 528/125

Primary Examiner—John Kight, III
Assistant Examiner—P. Hampton-Hightower
Attorney, Agent, or Firm—George F. Helfrich

[57] ABSTRACT

Novel polyimides have been prepared from the reaction of aromatic diahydrides with novel aromatic diamines having carbonyl and ether groups connecting aromatic rings containing pendant methyl groups. The methyl substituent polyimides exhibit good solubility and form tough, strong films. Upon exposure to ultraviolet irradiation and/or heat, the methyl substituted polyimides crosslink to become insoluble.

7 Claims, No Drawings

METHYL SUBSTITUTED POLYIMIDES CONTAINING CARBONYL AND ETHER CONNECTING GROUPS

ORIGIN OF THE INVENTION

The invention described herein was jointly made in the performance of work under a NASA contract and is subject to the provisions of Section 305 of the National Aeronautics and Space Act of 1958, as amended, Public Law 85-568 (72 Stat. 435; 42 USC 2457).

CROSS-REFERENCE

This application is related to our co-pending application Ser. No. 07/433,812, filed Nov. 9, 1989, entitled "Polyimides with Carbonyl and Ether Connecting Groups Between the Aromatic Rings."

BACKGROUND OF THE INVENTION

1. Field of the Invention

This invention relates generally to polyimides. It relates particularly to soluble, thermally-processable polyimides with high glass transition temperatures and good mechanical properties. These polyimides can crosslink either thermally or photolytically to yield insoluble polymer networks. It also relates to novel monomers used in the preparation of these polyimides.

2. Description of the Prior Art

Polyimides are condensation polymers commonly synthesized by the reaction of aromatic dianhydrides with aromatic diamines. The intermediate polyamide acid is either thermally or chemically cyclodehydrated to form the polyimide as depicted in Equation (1).

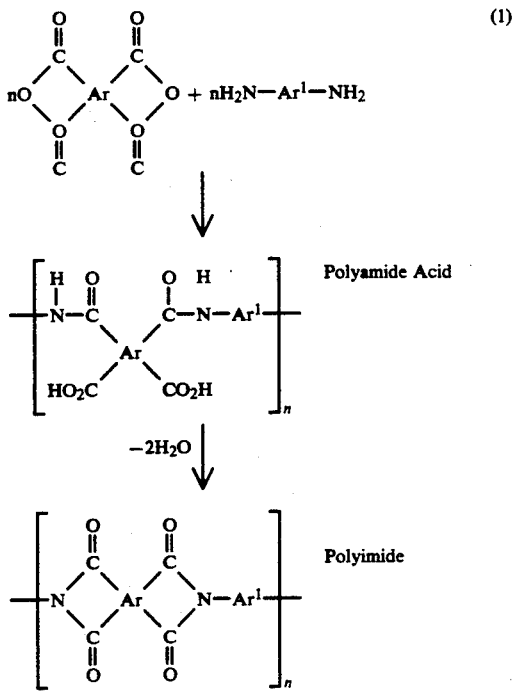

Ar is a tetravalent aromatic radical which can be as simple as 1,2,4,5-tetrasubstituted benzene. Ar may be a bis-4-(o-diphenylene) having the generic structure

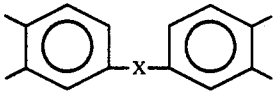

where X=nil, O, S, $SO_2$, C=O, $Si(CH_3)_2$, and the like, or Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene, or any other appropriate divalent radical.

Synthesis and characterization of polyimides has been extensively reported in the literature. The preparation of aromatic polyimides by reaction of an aromatic dianhydride with an aromatic diamine, followed by thermal cyclization was first reported in 1963 [G. M. Bower and L. W. Frost, *J. of Polym. Sci.*, A1, 3135 (1963)]. Several reviews on polyimides have been published [C. E. Sroog, "Polyimides" in *Encyclopedia of Polym. Sci. and Technology*, (H. R. Mark, N. G. Gaylord, and N. M. Bikales, Ed.), Interscience Publishers New York, 1969, Vol. 11, pp. 247-272; N. A. Adrova, M. I. Bessonov, L. A. Lauis, and A. P. Rudakov, *Polyimides*, Technomic Publishing Co., Inc., Stamford, Conn., 1970]; D. Wilson, H. D. Stenzenberger and P. M. Hergenrother, *Polyimides*, Blackie and Son Ltd., Glasgow, United Kingdom, 1990. Wholly aromatic polyimides are known for their exceptional thermal, thermooxidative and chemical resistance.

Typically the polyamide acid precursors are soluble in the reaction medium, a polar aprotic solvent such as N,N-dimethylacetamide, N,N-dimethylformamide, N-methylpyrrolidinone, dimethyl sulfoxide, or ether solvents such as diglyme. Upon ring closure the resulting polyimide usually becomes insoluble in the previously mentioned solvents. Consequently, all solution processing, for example, prepregging, film casting, fiber spinning, and coating application, is normally done with the polyamide acid. Soluble high molecular weight polyimides are rare and limited to cases where solubilizing groups are incorporated to reduce chain regularity or where the effect of the aromatic polyimide moiety is diluted by the presence of more flexible groups. For example, XU-218, an amorphous polyimide commercially available from Ciba-Geigy, is soluble in N,N-dimethylacetamide due to incorporation of an asymmetric 1,3,3-trimethyl-1-phenylindene group into the polyimide backbone. The incorporation of oxyethylene units into polyimide backbones has resulted in material which are soluble in N-methylpyrrolidinone [F. W. Harris, A. J. Karnavas, S. Das, C. N. Curcuras, and P. M. Hergenrother, *Polymeric Materials: Science and Engineering Preprints*, 54, 89 (1986)].

The addition of methyl groups onto an aromatic ring of a polyimide chain has been found in some instances to be an effective means of disrupting the regularity of the chain and increasing the glass transition temperature of the polyimide [F. W. Harris and S. H. S. Lien, *Polymeric Materials: Science and Engineering Preprints*, 60, 197 (1989)].

A primary object of the present invention is to provide new polyimides that are especially useful as coatings, films, membranes, photoresists, and insulators.

Another object of the present invention is to provide soluble, thermally processable polyimides with high glass transition temperatures and good mechanical properties which can crosslink to yield insoluble polymer networks.

Another object of the present invention is the synthesis of two new monomers which have utility in the production of the above polyimides: 1,3-bis(3-methyl-4-aminophenoxy-4'-benzoyl)benzene and 1,3-bis(3,5-dimethyl-4-aminophenoxy-4'-benzoyl)benzene.

SUMMARY OF THE INVENTION

According to the present invention, novel polyimides are prepared by the reaction of aromatic dianhydrides with novel aromatic diamines containing carbonyl and ether groups connecting aromatic rings containing pendant methyl groups. The novel aromatic diamines are prepared by the reactions of 3-methyl-4-aminophenol and 3,5-dimethyl-4-aminophenol with bis(4-fluorobenzoyl) terminated compounds in the presence of potassium carbonate. Polyimides prepared according to the present invention are generally amorphous, and when the polyamide acids are converted to the corresponding polyimides under conditions which prevent thermal crosslinking, the resulting polyimides are much more soluble than similar polyimides which do not contain methyl substituents. Upon exposure to ultraviolet radiation or temperature >275° C. in air, the methyl substituted polyimides according to the present invention crosslink to form insoluble polymer networks.

Accordingly, a soluble polyimide according to the present invention may be applied as a coating, film, insulator, photoresist, etc., and rendered insoluble and resistant to chemical attack by crosslinking the polymer chains, either thermally or photolytically. The methyl groups are understood to provide a labile functionality for photolytic crosslinking, which process is apparently enhanced by the presence of carbonyl groups in the polymer chain.

DESCRIPTION OF THE PREFERRED EMBODIMENTS

The general reaction sequence in Equation (2) for the synthesis of novel diamines according to the present invention is represented by the following equations:

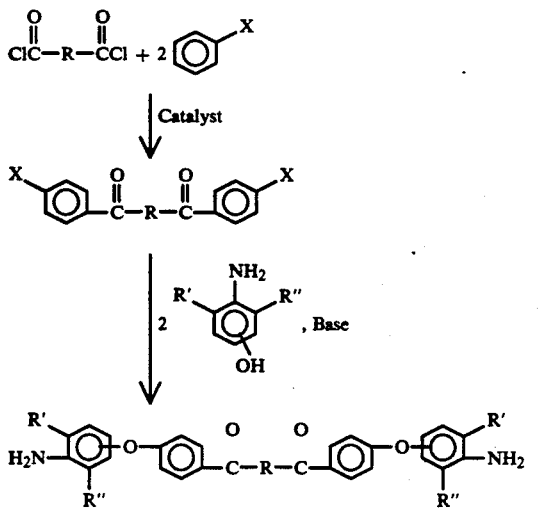

where:
R is selected from the group of aliphatic or aromatic radicals consisting of:

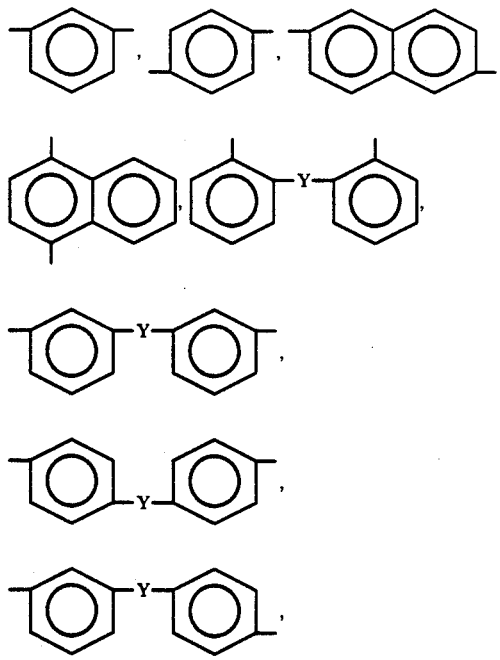

wherein
Y=nil, O, S, C=O, SO$_2$, CH$_2$, C(CH$_3$)$_2$, C(CF$_3$)$_2$, Si(CH$_3$)$_2$ or mixtures thereof:
R' is CH$_3$;
R" is either H or CH$_3$;
x is an integer between 1 and 10;
and X is either a fluorine or a chlorine atom.

The base is an alkali metal hydroxide or carbonate selected from NaOH, KOH, Na$_2$CO$_3$, K$_2$CO$_3$ and the like. The catalyst is a Lewis acid which is preferably AlCl$_3$, but may be AlBr$_3$, FeCl$_3$, SnCl$_4$, BCl$_3$, BF$_3$ and the like.

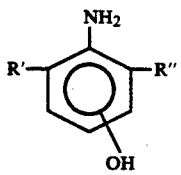

represents 4-methyl-3-aminophenol, 3-methyl-4-aminophenol, or 3,5-dimethyl-4-aminophenol.

Other aminophenols can also be used such as

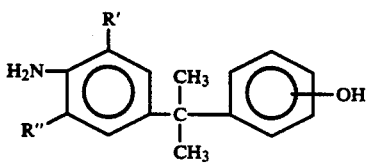

where the NH$_2$ and OH groups may be in the 3 or 4 position and R' and R" are ortho to the NH$_2$ group.

Additionally, novel diamines according to the present invention are prepared by reduction of the corresponding dinitro compound.

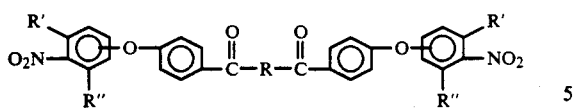
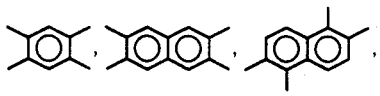

Therefore Ar' is equivalent to either

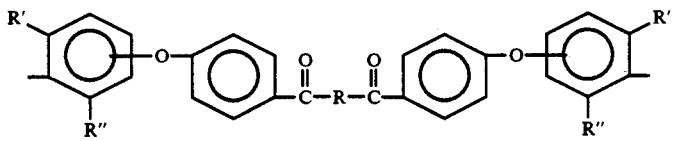

or

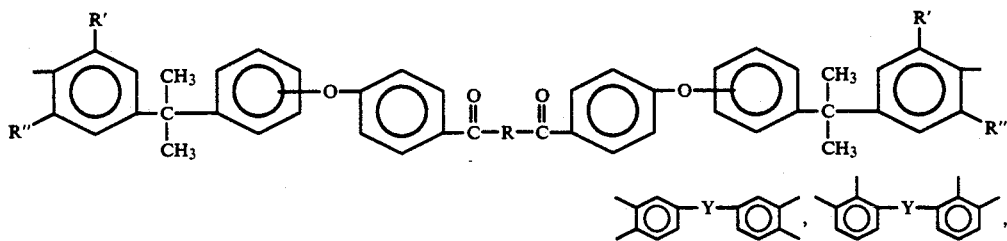

in equation (3) for the synthesis of new polyimides according to the present invention.

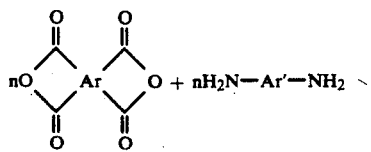   (3)

↓ Solvent

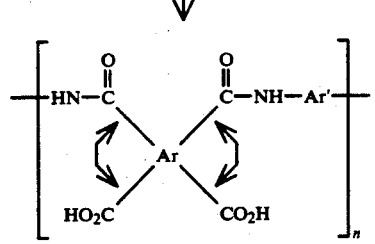

Cyclodehydration ↓ −2nH₂O

[structure]ₙ where n is an integer from 4–100. The solvent is preferably N,N-dimethylacetamide (DMAc), but may be other solvents such as N,N-dimethylformamide, dimethyl sulfoxide, N-methylpyrrolidinone (NMP), m-cresol, or ether solvents such as diglyme.

Cyclodehydration is accomplished chemically or by heating the intermediate polyamide acid at temperatures exceeding 150° C.

Ar is selected from a group of radicals consisting of

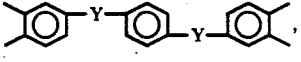

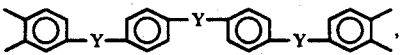

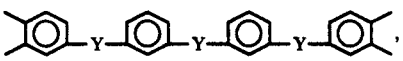

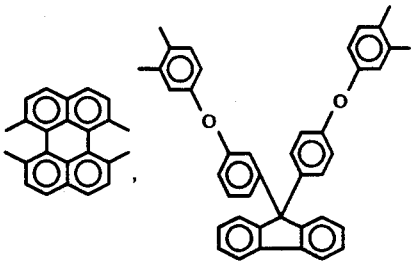

wherein Y=nil, O, S, C=O, SO₂, CH₂, C(CH₃)₂, C(CF₃)₂, Si(CH₃)₂ or mixtures thereof.

The following examples illustrate monomer synthesis and the reaction sequence for the synthesis of several of the polyimides described according to the present invention.

EXAMPLES

I. Monomer Synthesis (A) 1,3-Bis(4-fluorobenzoyl)benzene

Anhydrous aluminum chloride (160.0 g, 1.20 mol) was added to a stirred solution of isophthaloyl chloride (101.5 g, 0.50 mol) dissolved in fluorobenzene (480.5 g, 5.0 mol) over a five to ten minute period. The mixture was stirred at room temperature for one hour and then maintained at 70°–80° C. for four hours. After cooling, the reaction mixture was poured onto approximately 2000 g of ice containing 100 mL of concentrated hydrochloric acid. The resulting suspension was separated by decantation and washed several times with water. The organic layer was distilled to remove excess fluorobenzene and the solid residue was collected by filtration, washed with water, and dried at 100° C. The crude solid was recrystallized from approximately 1000 mL of toluene to afford 130.5 g (81% yield) of 1,3-bis(4-fluorobenzoyl)benzene; m.p. 177.5°-178.5° C.; $^1$H NMR (CDCl$_3$) δ 6.8-8.3 (m, 12H, aromatic). Anal. Calcd. for $C_{20}H_{12}F_2O_2$: C, 74.53%; H, 3.75%; F, 11.79%. Found: C, 74.33%; H, 3.59%; F, 11.42%.

(B)
1,3-Bis(3-methyl-4-aminophenoxy-4'-benzoyl)benzene (1,3-BMABB)

3-Methyl-4-aminophenol (24.6 g, 0.20 mol) was dissolved in a solution of DMAc (100 mL) and toluene (50 mL) in a three-neck flask equipped with a Dean-Stark trap. Powdered anhydrous potassium carbonate (34.5 g, 0.25 mol) was added and the reaction temperature was increased to remove water by azeotropic distillation. Toluene was removed until the temperature reached 130° C. 1,3-Bis(4-fluorobenzoyl)benzene (32.24 g, 0.10 mol) was then added and the reaction mixture stirred at about 140° C. overnight under a nitrogen atmosphere. The mixture was allowed to cool and subsequently added to water to precipitate a light brown solid which was collected by filtration and dried (50 g, 94% crude yield). Two recrystallizations from an ethanol/toluene mixture afforded 1,3-bis(3-methyl-4-aminophenoxy-4'-benzoyl)benzene (33 g, 62% yield) as a light tan crystalline solid; m.p. 131°-132° C.; $^1$H NMR (CDCl$_3$) δ 2.17 (s, 6H, CH$_3$), 3.62 (s, 4H NH$_2$), 6.5-8.2 (m, 18H, aromatic). Anal. Calcd for $C_{34}H_{26}N_2O_4$: C, 77.25%; H, 5.34%; N, 5.30%. Found: C, 77.27%; H, 5.57%; N, 5.24%.

(C) 3,5-Dimethyl-4-Aminophenol

A diazonium salt solution was prepared by slowing adding a cold solution of sodium nitrite (75.90 g, 1.10 mol) and water (400 mL) to a solution of aniline (93.13 g, 1.00 mol), concentrated hydrochloric acid (300 mL) and water (300 mL) cooled to 5°-10° C. The cold diazonium salt solution was added slowly (30-40 minutes) with stirring to a solution of 3,5-dimethylphenol (122.17 g, 1.00 mol) in water (1.2 L) containing sodium hydroxide (80.0 g, 2.0 mol) in a 4-L beaker at 5°-10° C. The reaction mixture was allowed to warm to ambient temperature. The red-orange solid of 3,5-dimethyl-4-phenylazophenol was collected by filtration, dried and recrystallized twice from methanol-water to afford 132 g; yield; 58%; m.p. 98°-100° C.

3,5-Dimethyl-4-phenylazophenol (132.0 g, 0.583 mol) was dissolved in methanol (500 mL) and pure (100%) hydrazine hydrate (113 mL, 2.33 mol), and Raney nickel [50% slurry in water (Aldrich), (2.5 mL)] was added to give an exothermic reaction. The mixture was stirred for one hour at ambient temperature and then heated to gentle reflux for three hours. The solution was filtered hot and cooled to room temperature. The crystals which formed were collected by filtration and dried to afford 3,5-dimethyl-4-aminophenol (42.4 g, 60% yield) as a white solid; m.p. 180.5-182.5; $^1$H-NMR (DMF-d$_7$). δ 2.10 (s, 6H, CH$_3$), 5.32 (s, 2H, NH$_2$), 5.32 (s, 1H, OH), 6.45 (s, 2H, aromatic).

(D)
1,3-Bis(3,5-dimethyl-4-aminophenoxy-4'-benzoyl)benzene (1,3-BDABB)

1,3-Bis(3,5-dimethyl-4-aminophenoxy-4'-benzoyl)benzene was prepared in a manner similar to that for 1,3-BMABB using 1,3-bis(4-fluorobenzoyl)benzene and 3,5-dimethyl-4-aminophenol. The product was recrystallized from 1:1 ethanol-toluene; 37% yield; m.p. 150°-153° C.; $^1$H NMR (CDCl$_3$) δ 2.20 (s, 12H, CH$_3$), 3.55 (s, 4H, NH$_2$), 6.6-8.2 (m, 16H, aromatic). Anal. Calcd for $C_{36}H_{32}N_2O_4$; C, 77.68%; H, 5.79%; N, 5.03%. Found: C, 77.52%, H, 5.81%; N, 4.91%.

II. Poly(amid Acid) Synthesis

Polyamide acids were prepared at a concentration of 15% solids content (w/w) by the addition of a stoichiometric amount of an appropriate dianhydride [3,3',4,4'-benzophenonetetracarboxylic dianhydride (BTDA), pyromellitic dianhydride (PMDA), or 4,4'-oxydiphthalic anhydride (ODPA)] to a mechanically stirred solution of a diamine according to the present invention in DMAc under a nitrogen atmosphere at ambient temperature. The resulting polyamide acid solutions were stirred overnight at ambient temperature under nitrogen, and inherent viscosities at 0.5% concentration in DMAc at 25° C. were subsequently determined. See Table I.

TABLE I

| | Polymer Characterization | |
|---|---|---|
| Designation | Poly(amic acid), $\eta_{inh}$(dL/g) | Polyimide* $T_g$, °C. |
| PMDA/1,3-BMABB | 0.80 | 262 |
| BTDA/1,3-BMABB | 0.90 | 238 |
| ODPA/1,3-BMABB | 0.94 | 231 |
| PMDA/1,3-BDABB | 0.65 | 281 |
| BTDA/1,3-BDABB | 0.45 | 253 |
| ODPA/1,3-BDABB | 0.39 | 243 |

*Film dried for one hour at 300° C. in air

III. Chemical Conversion of Polyamide acid to Polyimide

A solution of acetic anhydride (7 mL) pyridine (7 mL) and DMAc (10 mL) was added slowly to a stirred solution (about 26 mL) of polyamide acid (2 g) in DMAc (7% solids content) at ambient temperature under nitrogen. After complete addition, the solution was stirred about one hour at ambient temperature and then overnight at temperatures as high as 120° C. under nitrogen. In the case of the BTDA/1,3-BMABB and PMDA/1,3-BMABB polymers, the polymer precipitated during the heating period. The reaction mixture was poured into methanol and the solid collected by filtration, washed with methanol and subsequently dried in vacuo at 200° C. overnight. The inherent viscosities of the chemically imidized PMDA/1,3-BMABB, BTDA/1,3-BMABB and ODPA/1,3-BMABB polyimides in NMP at 0.5% concentration at 25° C. were 0.45, 0.60, and 0.81 dL/g, respectively. The inherent viscosities of the chemically imidized PMDA/1,3-BDABB, BTDA/1,3-BDABB, and ODPA/1,3-BDABB polyimides were 0.39, 0.32, and 0.29 dL/g, respectively in NMP. See Table II.

TABLE II

| Polyimide Characterization | | |
|---|---|---|
| Designation | $\eta_{inh}$(dL/g) | $T_g$(°C.) [$T_m$] |
| PMDA/1,3-BMABB | 0.45 | [330, 347] |
| BTDA/1,3-BMABB | 0.60 | 212 |
| ODPA/1,3-BMABB | 0.81 | 209 |
| PMDA/1,3-BDABB | 0.39 | 258 |
| BTDA/1,3-BDABB | 0.32 | 232 |
| ODPA/1,3-BDABB | 0.29 | 224 |

IV. Preparation of Polyimide in m-Cresol

The following procedure was used to prepare a polyimide in m-cresol. BTDA (1.9334 g, 0.0060 mol) was added to mechanically stirred solution of 1,3-BDABB (3.3400 g, 0.0060 mol) in m-cresol (27.7 mL) and toluene (30 mL). Isoquinoline (eight drops) was added, and the temperature of the solution was gradually increased. Water was removed by azeotropic distillation with toluene under an atmosphere of flowing nitrogen. Excess toluene was removed and the reaction mixture was maintained at 180°–185° C. for three hours. The polyimide remained in solution on cooling to room temperature.

A small amount of the solution was added to methanol to precipitate a yellow solid, which was washed with methanol and dried at 200° C. in vacuo overnight. The inherent viscosity at a concentration of 0.5% in 25° C. in m-cresol was 0.30 dL/g. A transparent orange film cast from the as-prepared m-cresol solution and subsequently dried for one hour each at 100°, 200°, and 300° C. in air was fingernail creasable and insoluble in hot m-cresol.

V. Films

The DMAc polyamide acid solutions of Example II (15% solids concentration) were centrifuged, and the decantate was cast onto plate glass using a 30 mil doctor blade and dried to a tack-free form in a dust-free chamber. The films on glass were then converted to the polyimide by heating in air at 100°, 200°, 300° C. for one hour at each temperature. In some cases, boiling in water was required to remove the polyimide films from the glass plates. Mechanical properties of the 2.0–2.5 mil thick films were determined according to ASTM D882 using four to six specimens per test condition. See Table III. Films cured in air under these conditions were insoluble in NMP and m-cresol due to crosslinking. See Table IV. The glass transition temperatures (Table I) were higher than those of the chemically imidized polyimides (Table II).

TABLE III

| | Thin Film Properties of Polyimides | | | | |
|---|---|---|---|---|---|
| Polyimide | Temp. (°C.) | Tensile Yield (ksi) | Tensile Strength (ksi) | Tensile Modulus (ksi) | Elongation (%) |
| BTDA/1,3-BMABB | 25 | 14.9 | 22.0 | 479 | 6.3 |
| | 177 | 5.5 | 7.8 | 215 | 82.7 |
| PMDA/1,3-BMABB | 25 | 11.2 | 17.4 | 472 | 16.3 |
| | 177 | 5.7 | 7.9 | 250 | 39.5 |
| ODPA/1,3-BMABB | 25 | 11.0 | 19.9 | 504 | 6.6 |
| | 177 | 5.0 | 7.4 | 254 | 42.4 |
| BTDA/1,3-BDABB | 25 | 11.2 | 15.8 | 406 | 12.9 |
| | 177 | 7.5 | 9.5 | 295 | 20.2 |
| PMDA/1,3-BDABB | 25 | 6.7 | 13.5 | 326 | 19.2 |
| | 177 | 6.3 | 8.6 | 234 | 24.7 |
| ODPA/ | 25 | 6.1 | 15.3 | 410 | 5.8 |
| 1,3-BDABB | 177 | 5.7 | 8.9 | 295 | 6.6 |

TABLE IV

| Polyimide Solubilities | | | |
|---|---|---|---|
| | Conversion | Solvent[2] | |
| Polyimide | Method | NMP | m-Cresol |
| BTDA/1,3-BMABB | Thermal | I | I |
| | Chemical | S | S |
| PMDA/1,3-BMABB | Thermal | I | I |
| | | S | S |
| BTDA/1,3-BDABB | Thermal | I | I |
| | Chemical | S[3] | S[3] |
| PMDA/1,3-BDABB | Thermal | I | I |
| | Chemical | S[3] | S[3] |
| ODPA/1,3-BDABB | Thermal | I | I |
| | Chemical | S[3] | S[3] |

[1]Thermal = polyamic acid film converted to polyimide by heating for one hour each at 100, 200, and 300° C. in air.
Chemical = polyamic acid treated with acetic anhydride at 120° C. for 18 hours followed by drying at 200° C. for 18 hours.
[2]Solids content 3–5%, I = insoluble, S = soluble.
[3]Formed solutions of 15% solids content (w/v) upon warming.

VI Ultraviolet Irradiation

A thin film (1.7 mils thick) of the ODPA/1,3-BMABB polyimide was cast from an NMP solution of the chemically imidized powder and dried under vacuum to a maximum temperature of 240° C. The tough, flexible film readily dissolved in NMP and m-cresol with slight warming. The glass transition temperature was 221° C. The film was then exposed to ultraviolet radiation from a Xenon arc lamp operating over a range of 200–2000 nm at 0.21 watts/cm$^2$ for a period of 100 hours. The exposed film was then insoluble in hot NMP and m-cresol, and the glass transition temperature had risen to 224° C.

A thin film (2.4 mils thick) of the BTDA/1,3-BMABB polyamide acid was cast from a DMAc solution and was thermally imidized under vacuum by heating to a maximum temperature of 240° C. This film dissolved in m-cresol after heating for several hours and had a glass transition temperature of 220° C. After 100 hours of exposure to ultraviolet radiation as described immediately above, the glass transition temperature of the polymers had risen to 232° C., and the film was insoluble in m-cresol after heating.

The present invention has been described in detail and with respect to certain preferred embodiments thereof. As is understood by those of skill in the art, variations and modifications in this detail may be effected without any departure from the spirit and scope of the present invention, as defined in the hereto appended claims.

What is claimed is:

1. A high molecular weight linear polyimide having high strength and toughness and a degree of solubility in organic solvents, which polyimide can be induced to crosslink or chain extend to form an insoluble polymer network, the polyimide having the general structural formula:

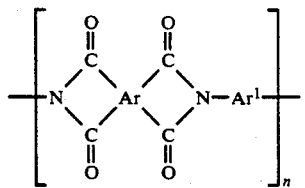

(a) wherein Ar is a radical selected from the group consisting of:

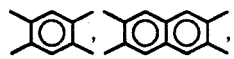

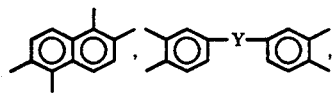

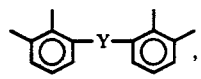

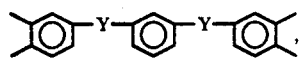

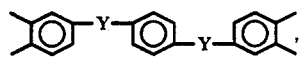

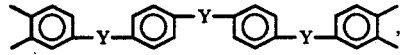

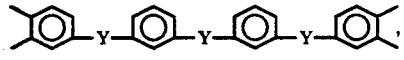

, and

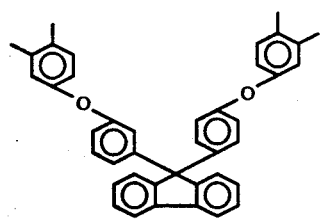

wherein Y is a bond or is a substituent selected from the group consisting of:

O, S, C=O, SO$_2$, CH$_2$, C(CH$_3$)$_2$, C(CF$_3$)$_2$, and Si(CH$_3$)$_2$;

(b) wherein Ar' is a radical having the structural formula selected from the group consisting of:

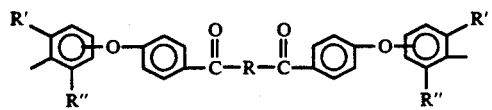

and

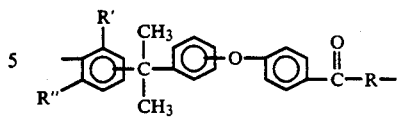

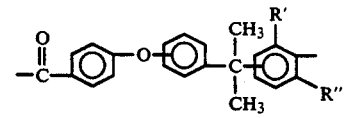

wherein R is a radical selected from the group consisting of:

—(CH$_2$)$_x$—, —(CF$_2$)$_x$—,

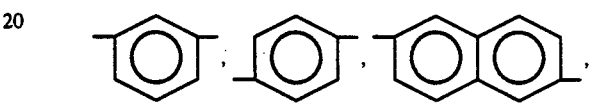

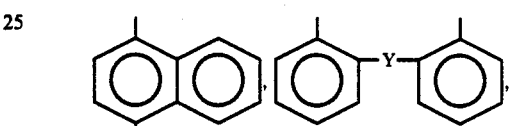

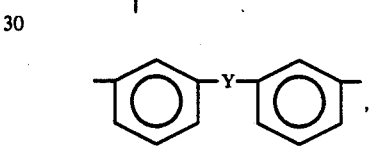

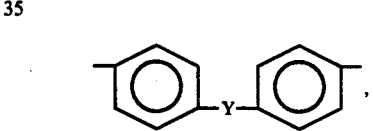

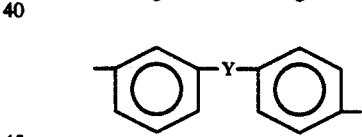

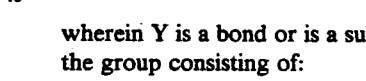

wherein Y is a bond or is a substituent selected from the group consisting of:

O, S, C=O, SO$_2$, CH$_2$, C(CH$_3$)$_2$, C(CF$_3$)$_2$, Si(CH$_3$)$_2$;

wherein x is an integer between 1 and 10;
wherein R' is CH$_3$;
wherein R" is either H or CH$_3$; and
wherein n is an integer between 4 and 100.

2. A diamine having the general structural formula:

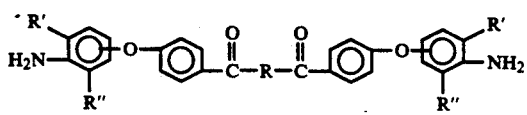

wherein R is a radical selected from the group consisting of:

—(CH$_2$)$_x$—, —(CF$_2$)$_x$—,

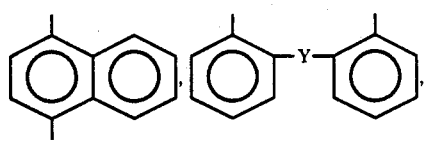

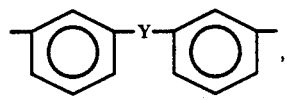

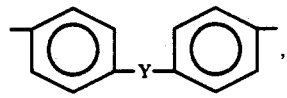

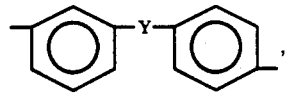

wherein Y is a bond or is a substituent selected from the group consisting of;

$O, S, C=O, SO_2, CH_2, C(CH_3)_2, C(CF_3)_2,$ and $Si(CH_3)_2;$ wherein x is an integer between 1 and 10;
wherein R' is $CH_3$; and
wherein R" is either H or $CH_3$.

3. A diamine having the general structural formula:

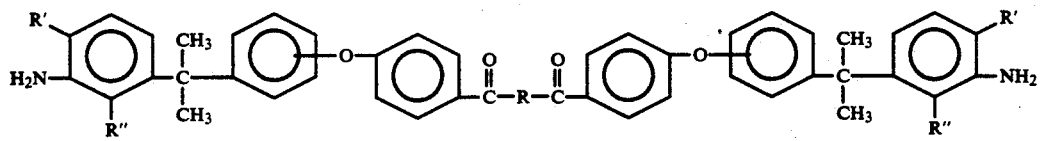

wherein R is a radical selected from the group consisting of:

$-(CH_2)_x-, -(CF_2)_x-,$

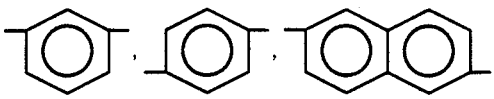

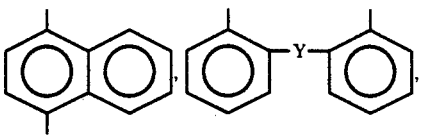

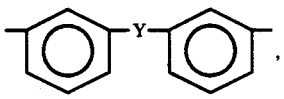

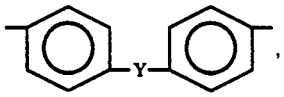

wherein Y is a bond or is a substituent selected from the group consisting of:

$O, S, C=O, SO_2, CH_2, C(CH_3)_2, C(CF_3)_2,$ and $Si(CH_3)_2;$ wherein x is an integer between 1 and 10;
wherein R' is $CH_3$; and
wherein R" is either H or $CH_3$.

4. A high molecular weight linear polyimide according to claim 1, which has been thermally crosslinked to form insoluble polymer networks therein.

5. A high molecular weight linear polyimide according to claim 1, which has been photolytically crosslinked to form insoluble polymer networks therein.

6. A thermally crosslinked high molecular weight linear polyimide according to claim 4 in the form of a film which has been thermally cured in air.

7. A thermally crosslinked high molecular weight linear polyimide according to claim 5 in the form of a film which has been exposed to ultraviolet radiation.

* * * * *